United States Patent
Sahin et al.

(10) Patent No.: US 8,229,363 B1
(45) Date of Patent: Jul. 24, 2012

(54) INTERFERER DETECTION FOR A WIRELESS COMMUNICATIONS NETWORK

(75) Inventors: Mustafa Emin Sahin, Ashburn, VA (US); Osama Tarraf, Leesburg, VA (US)

(73) Assignee: Reverb Networks, Inc., Ashburn, VA (US)

( * ) Notice: Subject to any disclaimer, the term of this patent is extended or adjusted under 35 U.S.C. 154(b) by 0 days.

(21) Appl. No.: 13/118,771

(22) Filed: May 31, 2011

Related U.S. Application Data (63) Continuation of application No. 13/110,205, filed on May 18, 2011.

(51) Int. Cl.
*H04B 1/00* (2006.01)

(52) U.S. Cl. .................. 455/63.1; 455/67.13

(58) Field of Classification Search ............ 455/423, 455/6–63.12
See application file for complete search history.

(56) References Cited

U.S. PATENT DOCUMENTS

| | | | |
|---|---|---|---|
| 5,796,722 | A | 8/1998 | Kotzin et al. |
| 6,141,565 | A | 10/2000 | Feuerstein et al. |
| 6,400,335 | B1 | 6/2002 | Weaver et al. |
| 6,574,477 | B1 | 6/2003 | Rathunde |
| 6,829,491 | B1 | 12/2004 | Yea et al. |
| 6,937,863 | B1 | 8/2005 | Gordon et al. |
| 7,016,685 | B1 | 3/2006 | Cain et al. |
| 7,623,455 | B2 | 11/2009 | Hilla et al. |
| 2002/0154614 | A1* | 10/2002 | Jagger et al. .............. 370/332 |
| 2003/0040277 | A1* | 2/2003 | Deats ........................ 455/63 |
| 2003/0191856 | A1 | 10/2003 | Lewis et al. |
| 2003/0229478 | A1 | 12/2003 | Rappaport et al. |
| 2004/0146093 | A1* | 7/2004 | Olson et al. .............. 375/148 |
| 2004/0196834 | A1 | 10/2004 | Ofek et al. |
| 2004/0203426 | A1* | 10/2004 | Cave et al. ............... 455/67.11 |
| 2004/0229621 | A1 | 11/2004 | Misra |
| 2005/0054367 | A1* | 3/2005 | Larsson et al. ............. 455/525 |
| 2005/0111408 | A1* | 5/2005 | Skillermark et al. ........ 370/331 |
| 2005/0176440 | A1 | 8/2005 | Sang et al. |
| 2005/0243723 | A1 | 11/2005 | Randriamasy |
| 2005/0277444 | A1 | 12/2005 | Rensburg et al. |
| 2006/0209721 | A1* | 9/2006 | Mese et al. ................. 370/254 |
| 2007/0002765 | A1 | 1/2007 | Kadaba et al. |
| 2007/0042784 | A1* | 2/2007 | Anderson .................. 455/450 |
| 2007/0058701 | A1* | 3/2007 | Wang et al. ............... 375/152 |
| 2007/0111663 | A1* | 5/2007 | Beyer et al. .............. 455/63.1 |
| 2007/0218862 | A1 | 9/2007 | Tatman et al. |
| 2008/0039089 | A1 | 2/2008 | Berkman et al. |

(Continued)

OTHER PUBLICATIONS

International Search Report issued Jun. 18, 2010 in International (PCT) Application No. PCT/US2010/31603.
International Search Report and Written Opinion of the International Searching Authority issued Nov. 3, 2010 in International (PCT) Application No. PCT/US2010/048927.

(Continued)

*Primary Examiner* — Jean Gelin
*Assistant Examiner* — Nathan Taylor (57) ABSTRACT

An apparatus, method and program detect interference in cell sites of a wireless communications network. A cell site from the cell sites of the wireless communications network is selected and signal code power measurements from mobile devices in the cell site are received so that the sources of signals being transmitted to the mobile devices can be determined. Interfering sources are determined based on the signal code power measurements and the active set of sources for the mobile devices. The signal code power measurements are summed and ranked, and transmitters associated with the ranked signal code power measurements for the interfering sources are determined. The same procedure is repeated for all cell sites of the wireless communications network, and the transmitter that is an interfering source for the highest number of cell sites is selected as a problem transmitter.

18 Claims, 6 Drawing Sheets

U.S. PATENT DOCUMENTS

| | | |
|---|---|---|
| 2008/0064432 A1 | 3/2008 | Park et al. |
| 2008/0096566 A1* | 4/2008 | Brunner et al. ............... 455/437 |
| 2008/0130582 A1* | 6/2008 | Lee et al. ...................... 370/332 |
| 2008/0225714 A1 | 9/2008 | Denis |
| 2009/0003236 A1 | 1/2009 | Aoyama et al. |
| 2009/0075648 A1 | 3/2009 | Reed et al. |
| 2009/0131038 A1 | 5/2009 | MacNaughtan et al. |
| 2009/0149134 A1* | 6/2009 | Gunnarsson et al. ........... 455/69 |
| 2009/0163223 A1 | 6/2009 | Casey |
| 2009/0196162 A1* | 8/2009 | Sambhwani et al. ......... 370/201 |
| 2010/0020771 A1* | 1/2010 | Ji et al. .......................... 370/336 |
| 2010/0087148 A1* | 4/2010 | Srinivasan et al. ........... 455/63.1 |
| 2010/0087149 A1* | 4/2010 | Srinivasan et al. ........... 455/63.1 |
| 2010/0233962 A1* | 9/2010 | Johansson et al. ........... 455/63.1 |

OTHER PUBLICATIONS

International Search Report and Written Opinion of the International Searching Authority issued Nov. 15, 2010 in International (PCT) Application No. PCT/US2010/048929.

International Search Report issued Nov. 24, 2010 in International (PCT) Application No. PCT/US2010/050627.

Office Action dated Oct. 13, 2010 issued in related U.S. Appl. No. 12/385,752.

Office Action dated May 5, 2011 issued in related U.S. Appl. No. 12/385,752.

Office Action mailed Jan. 11, 2012 for U.S. Appl. No. 13/118,823, filed May 31, 2011.

* cited by examiner

INTERFERER DETECTION FOR A WIRELESS COMMUNICATIONS NETWORK

This is a continuation application of U.S. patent application Ser. No. 13/110,205, filed on May 18, 2011.

BACKGROUND OF THE INVENTION

1. Field of the Invention

The present invention generally relates to planning and optimization of a universal mobile telecommunication system (UMTS) based network. In particular, the present invention relates to detecting and reducing interference from several transmitters in a UMTS network.

2. Description of the Related Art

Traditional network planning and optimization of a wireless network relies on static methodologies for finding site locations, dimensioning and configuring the radio resources to meet specified traffic demand. Traditional network optimization methods find the best configuration(s) of the wireless network to maximize the performance, which typically starts with an already working wireless network, followed by analysis and calculations done by engineers using software and hardware tools with extensive simulations of the network. Once a better configuration is determined, the new configuration is manually implemented.

However, manual network optimization consumes a large amount of human resources and is a lengthy process that is performed only when needed or periodically. Therefore, usage of network resource is not maximized, quality of service is degraded and end users or customer satisfaction is reduced.

Additionally, UMTS based wireless networks offer soft handover features that allow a mobile station (MS) to be served by multiple transmitters. The transmitters that serve the MS simultaneously constitute the active set for that MS. However, signals received by the MS that are not sent by the transmitters in the active set are considered interference signals.

Existence of interfering transmitters may lead to reduced network performance by reducing the number useful signals received by mobile stations. Moreover, interfering transmitters may cause pilot pollution, which is a phenomenon that occurs when there are too many potential serving cells to choose from.

Therefore, it would be useful to implement an automated device for network planning and optimization making it possible to reduce interference and maximizes overall network performance.

SUMMARY OF THE INVENTION

An embodiment of the invention is directed to method for detecting interference in cell sites of a wireless communications network, wherein the method includes selecting a cell site of cell sites in a wireless communications network, the cell site being a region in which wireless communications are provided to mobile devices; receiving signal code power measurements from the mobile devices in the cell site; and determining sources of signals being transmitted to the mobile devices in the cell site based on the signal code power measurements. In addition, the method includes generating a list of sources providing signals to the mobile devices in the cell site and then removing sources included in an active set for each mobile device thereby creating a list of interfering sources. The interfering sources are, for example, sources not assigned to provide wireless communication services to a mobile device in the cell site, but whose source signal is still being received by the mobile device.

In an embodiment of the invention the method includes summing and ranking the signal code power measurements for the sources on the list of interfering sources; and generating a list of transmitters associated with the summed or ranked signal code power measurements for the interfering sources. The list of interfering transmitters may include transmitters that have the highest interference power as measured by the mobile devices, transmitters that cause interference in the highest number of mobile devices, transmitters that cause interference in the highest number of cells, or transmitters with a highest weight metric assigned.

In an embodiment of the invention, the selecting, receiving, determining, generating of the list of sources, modifying, summing, generating of the list of transmitters, and the ranking are repeated for each of the cell sites of the wireless communications network.

An embodiment of the invention is directed to at least one program recorded on a non-transitory computer-readable storage medium for detecting interference in cell sites of a wireless network, wherein the at least one program causes a computer to perform an interferer detection method as described in the previous embodiment.

An embodiment of the invention is directed to a detection apparatus for detecting interference in cell sites of a wireless network including a communication interface; at least one processor; and a memory. The memory stores at least one detection program for detecting interference in cell sites of a wireless network, wherein the at least one detection program causes the detection apparatus to perform the detection method discussed above in the previous embodiment.

BRIEF DESCRIPTION OF THE DRAWINGS

In the drawings, like reference numbers generally indicate identical, functionally similar and/or structurally similar elements. Embodiments of the invention will be described with reference to the accompanying drawings, wherein.

Additional features are described herein, and will be apparent from the following description of the figures.

DETAILED DESCRIPTION OF THE INVENTION

In the description that follows, numerous details are set forth in order to provide a thorough understanding of the invention. It will be appreciated by those skilled in the art that variations of these specific details are possible while still achieving the results of the invention. Well-known elements and processing steps are generally not described in detail in order to avoid unnecessarily obscuring the description of the invention.

In the drawings accompanying the description that follows, often both reference numerals and legends (labels, text descriptions) may be used to identify elements. If legends are provided, they are intended merely as an aid to the reader, and should not in any way be interpreted as limiting.

Figure 1:
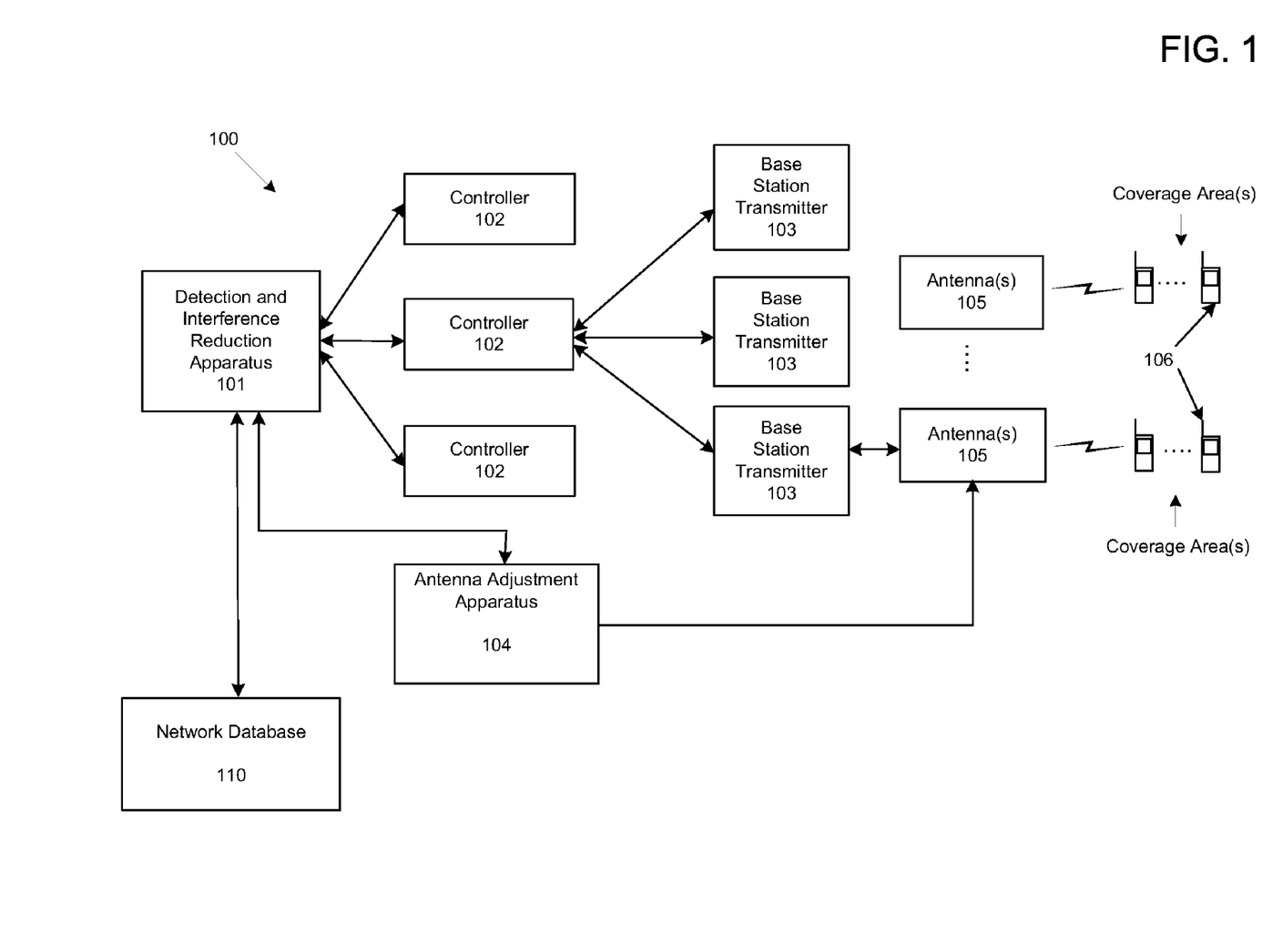
FIG. 1 illustrates a system for detecting and reducing interference in cell sites of a wireless communications network in accordance with an embodiment of the invention.

FIG. 1 is a system for detecting and reducing interference in cell sites of a wireless communications network in accordance with an embodiment of the invention. The wireless network 100 illustrated in FIG. 1 includes a detection and interference apparatus 101 And, the wireless network 100 refers to any type of computer network that is wireless, and is commonly associated with a telecommunications network whose interconnections are implemented without the use of wires such as with electromagnetic waves, such as radio waves or the like as a carrier. The basic components of the wireless network 100 include the detection and interference reduction apparatus 101; one or more controllers 102; one or more base station transmitters 103 (hereafter "transmitters 103") for supporting data communications between mobile devices 106 distributed throughout coverage areas (e.g., cell sites) provided by the wireless network 100 via antennas 105; a network database 110; and an antenna adjustment apparatus 104.

It should be understood by one of ordinary skill in the art that the connections between the detection and interference reduction apparatus 101 and the one or more network controllers 102, the antenna adjustment apparatus 104 and the network database 110 can be wireless, wired or a combination of wireless and wired. Similarly, it should be understood by one of ordinary skill in the art that the connections between the one or more controllers 102 and the one or more transmitters 103 can be wireless, wired or a combination of wireless and wired.

As seen in FIG. 1, the detection and interference reduction apparatus 101 receives network statistics and the current network configurations from the network database 110 related to the wireless communication system 100 for assisting in the monitoring and optimization performed. The network statistics may include, but are not limited to, key performance Indicators (KPIs). An example of KPIs include an interference power, successful call rate, call traffic and dropped calls rate, which is the ratio between the failed calls and the total number of calls requested. Another network statistic is the capacity of the network. Capacity can be measured by the total number of calls and/or the amount of delivered data in bits or the throughput (overall data rate) in case of data calls. Additionally, the detection and interference reduction apparatus 101 also receives information regarding the transmitters 103 and the antennas 105 from the antenna adjustment apparatus 104.

The wireless network 100 offers a soft handover feature that allows a mobile device 106 to be served by multiple transmitters 103. The transmitters 103 that serve mobile device 106 simultaneously constitute the active set for a mobile device 106, and there might be up to, for example, 3 transmitters 103 in an active set with one of the transmitters being the best server to the mobile device 106. Signals received by a mobile device 106 from a transmitter 103 that is not in the active set are considered interference signals from an interfering transmitter 103.

The detection and interference reduction apparatus 101 can be a server or other similar computer device capable of executing one or more algorithms for performing the detection and interference reduction in wireless network 100. A more detailed discussion of the structure of the detection and interference reduction apparatus 101 is noted below with reference to FIG. 4.

The controllers 102 illustrated in FIG. 1 control one or more of the transmitters 103 to affect performance in the corresponding coverage areas or cell sites provided by the transmitters 103 and antennas 105. Mobile devices 106 are distributed within the coverage areas or cell sites for participating in wireless data communications provided by the wireless network 100 via the transmitters 103 and the antennas 105. The mobile devices 106 include user equipment of various types such as fixed, mobile, and portable two way radios, cellular telephones, personal digital assistants (PDAs), or other wireless networking devices.

Each coverage area behaves as an independent cell site serving its own set of mobile devices 106. For fixed wireless systems, such as IEEE802.16-2004, each coverage area can be used by a single transmitter 103 or plurality of transmitters 103 operating each on a different frequency channel. For mobile systems, subscribers of a single coverage area are served by a single transmitter 103 that can be a single frequency channel for IEEE802.16e-2005 (or UMTS or 1x-EVDO Rev. B and C) or multiple frequency channels that can be supported by IEEE802.16m (or UMTS or 1xEVDO Rev. B and C).

As illustrated in FIG. 1, the antenna adjustment apparatus 104 is in direct communication with the detection and interference reduction apparatus 101 for sending information to and receiving information from the detection and interference reduction apparatus 101, which makes adjustments to the transmitters 103 and the antennas 105. The antenna adjustment apparatus 104 includes an algorithm that analyzes information received from the detection and interference reduction apparatus 101 and sends control signals to the antennas 105 for altering antenna parameters. The antenna adjustment apparatus 104 also sends information regarding the transmitters 103 and the antennas 105 to the detection and interference reduction apparatus 101. The detection and interference reduction apparatus 101 makes adjustments to the transmitters 103 via the controllers 102.

Figure 2:
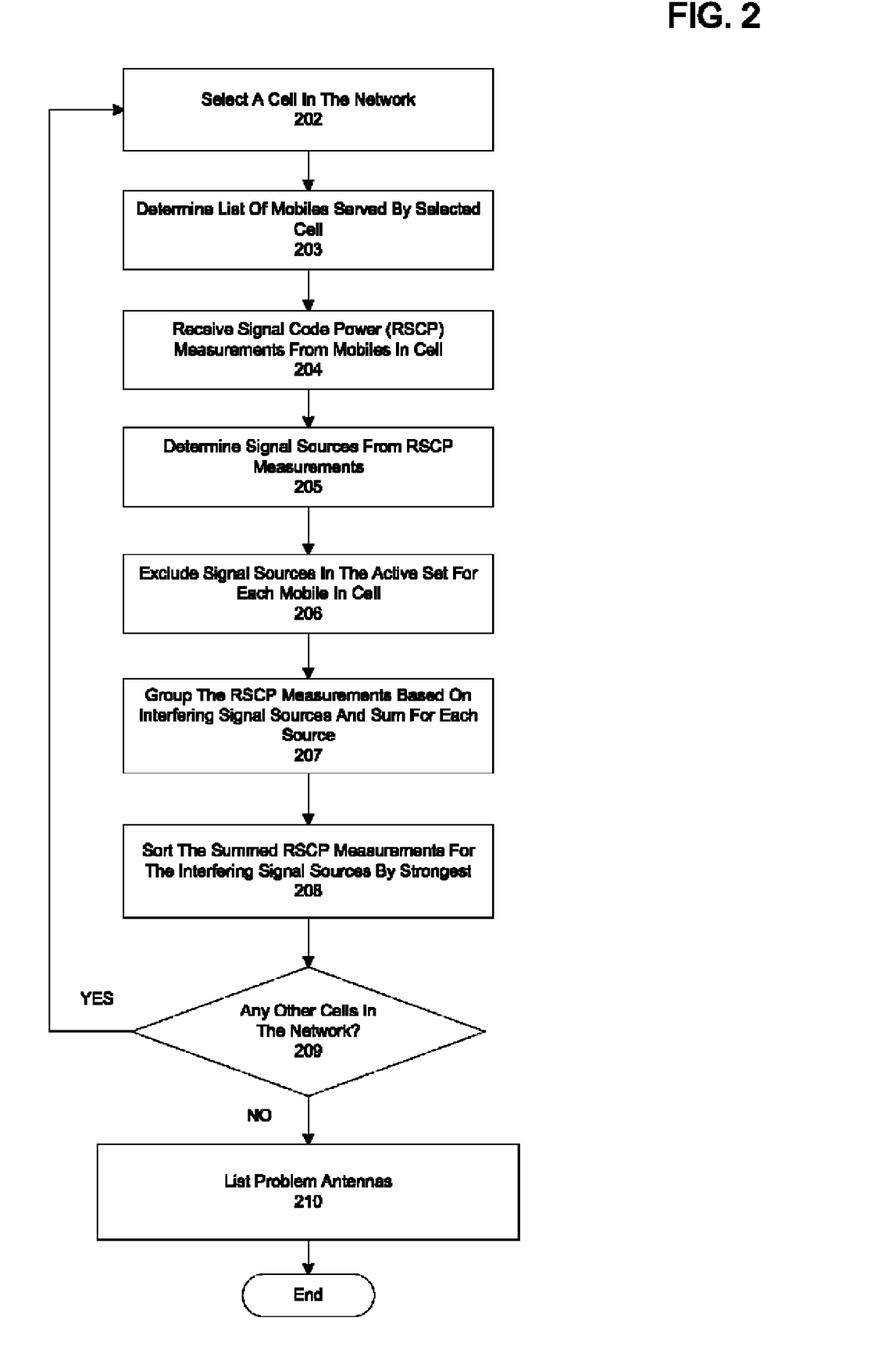
FIGS. 2 and 3 illustrate a method for detecting and reducing interference in cell sites of a wireless communications network in accordance with an embodiment of the invention.
Figure 3:
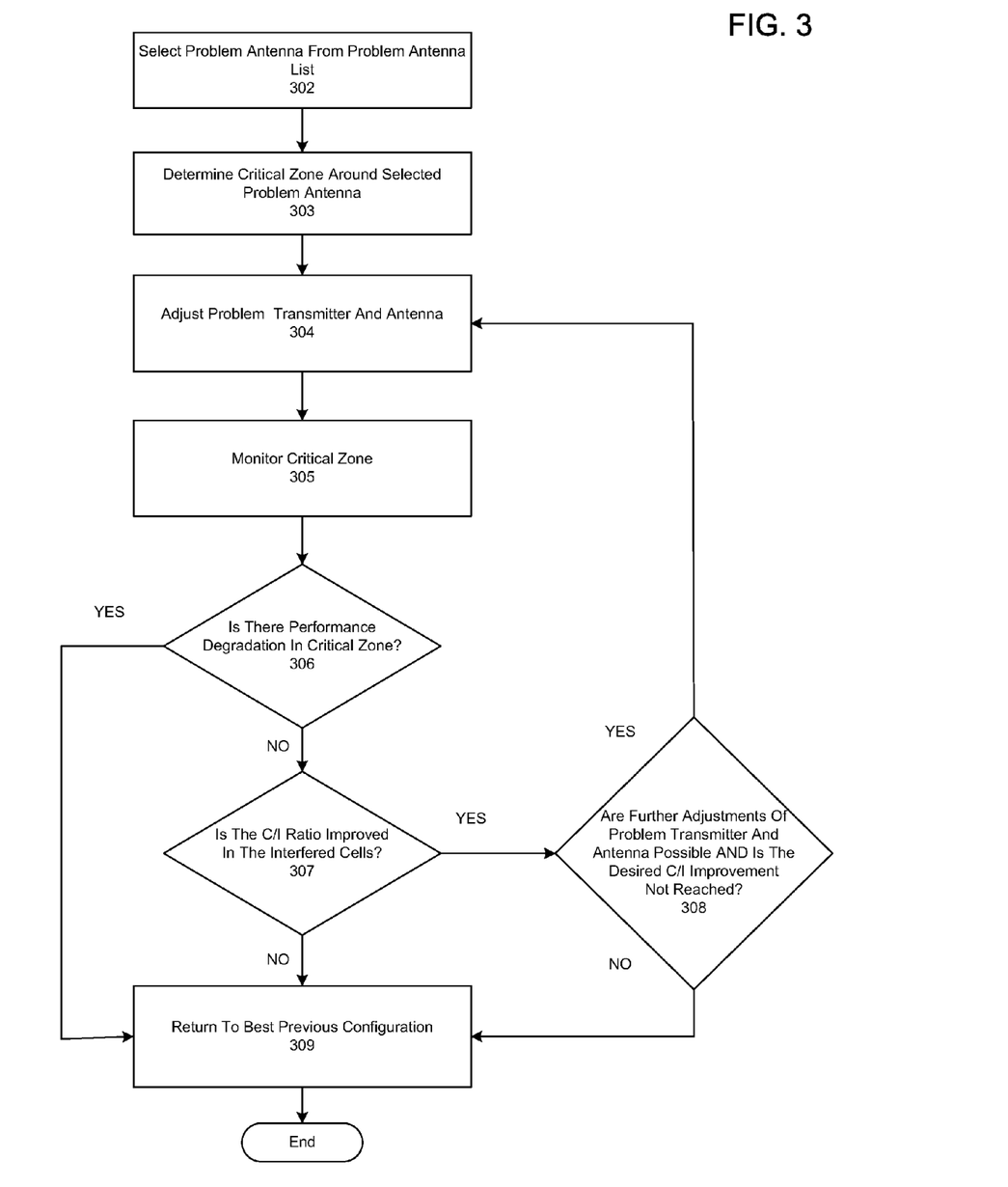

FIGS. 2 and 3 illustrate a method for detecting and reducing interference in cell sites of a wireless communications network in accordance with an embodiment of the invention. By way of example, the detection and interference reduction apparatus 101 can execute two separate algorithms; one for detecting interference caused by transmitters 103 and one algorithm for making modifications to parameters of interfering transmitters 103 and the antennas 105. However, the detection and interference reduction apparatus 101 can also execute one algorithm for detecting and reducing interference in cell sites of the wireless network 100 caused by the transmitters 103.

Figure 5:
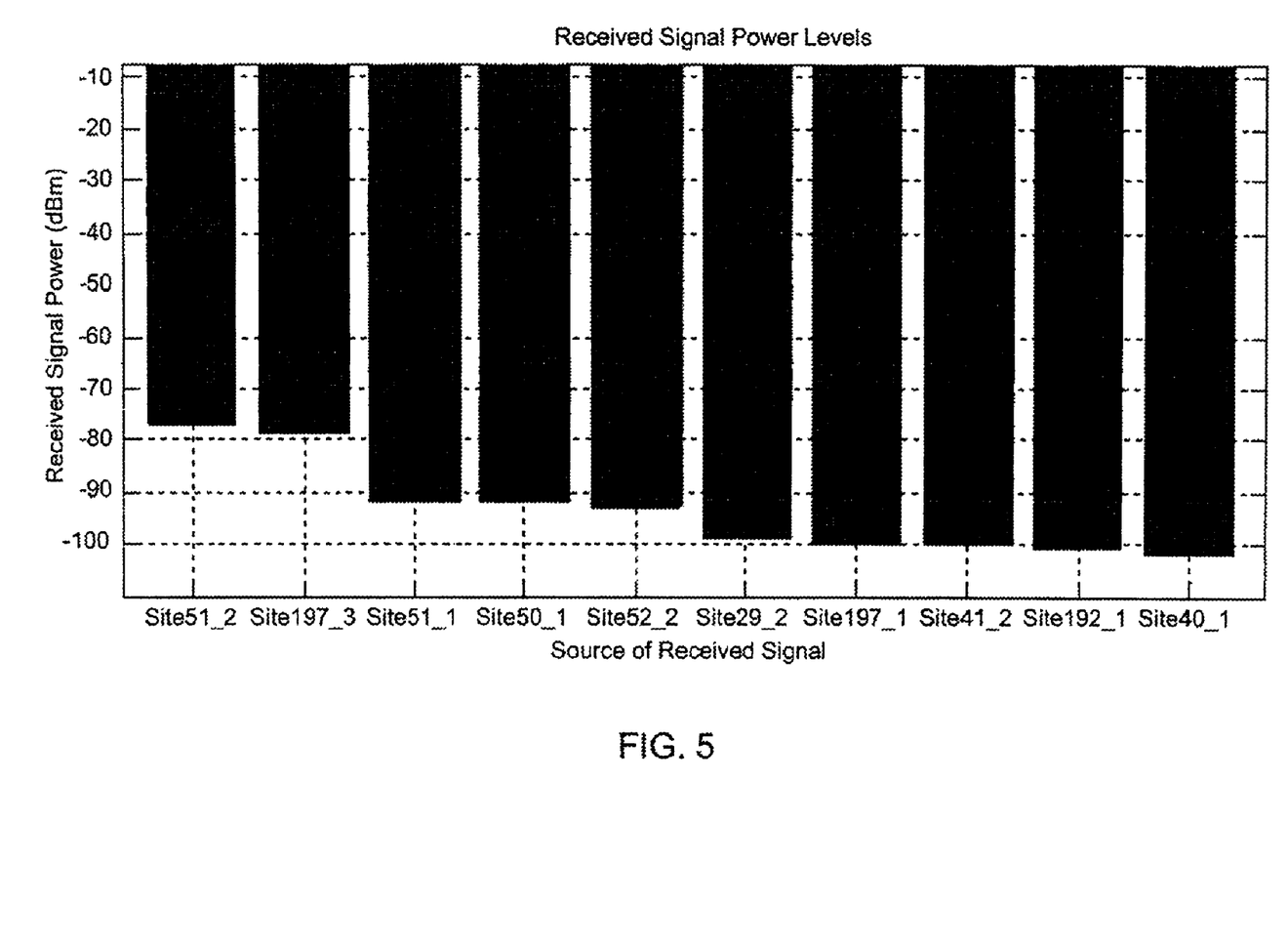
FIG. 5 is a graph illustrating exemplary RSCP values measured by a mobile device, according to an embodiment.

Referring now to FIG. 2, in step 202, the detection and interference reduction apparatus 101 selects a cell site in the wireless network 100 for detecting interference. The initial selection of the cell site may be based on network parameters received from the network database 110 or the antenna adjustment apparatus 104, or both. In step 203, the detection and interference reduction apparatus 101 determines a list mobile devices 106 served by the selected cell site. The list of mobile devices 106 in the cell site can be based on information regarding the cell site received from the network database 110 or the antenna adjustment apparatus 104. In step 204, the detection and interference reduction apparatus 101 acquires received signal code power (RSCP) values that are measured by the corresponding mobile devices 106 in the cell site. In step 205, the detection and interference reduction apparatus 101 determines the signal sources from the RSCP values measured. Exemplary RSCP values measured by a mobile device 106 are shown in FIG. 5.

In steps 206, the detection and interference reduction apparatus 101 excludes from the signal sources determined in step 205, the signal sources included in the active set for each mobile device 106 in the cell site. By excluding the signal sources in the active set, only the interfering signal sources or interfering power remain on a list of signal sources. An active set of signal sources are a set of sources assigned to provide source signals to a mobile device 106 in the cell site, whereas the interfering sources are sources not assigned to provide wireless communication services to a mobile device 106 in the cell site, but whose source signal is still being received by the mobile device 106 (i.e., interfering power).

Figure 6:
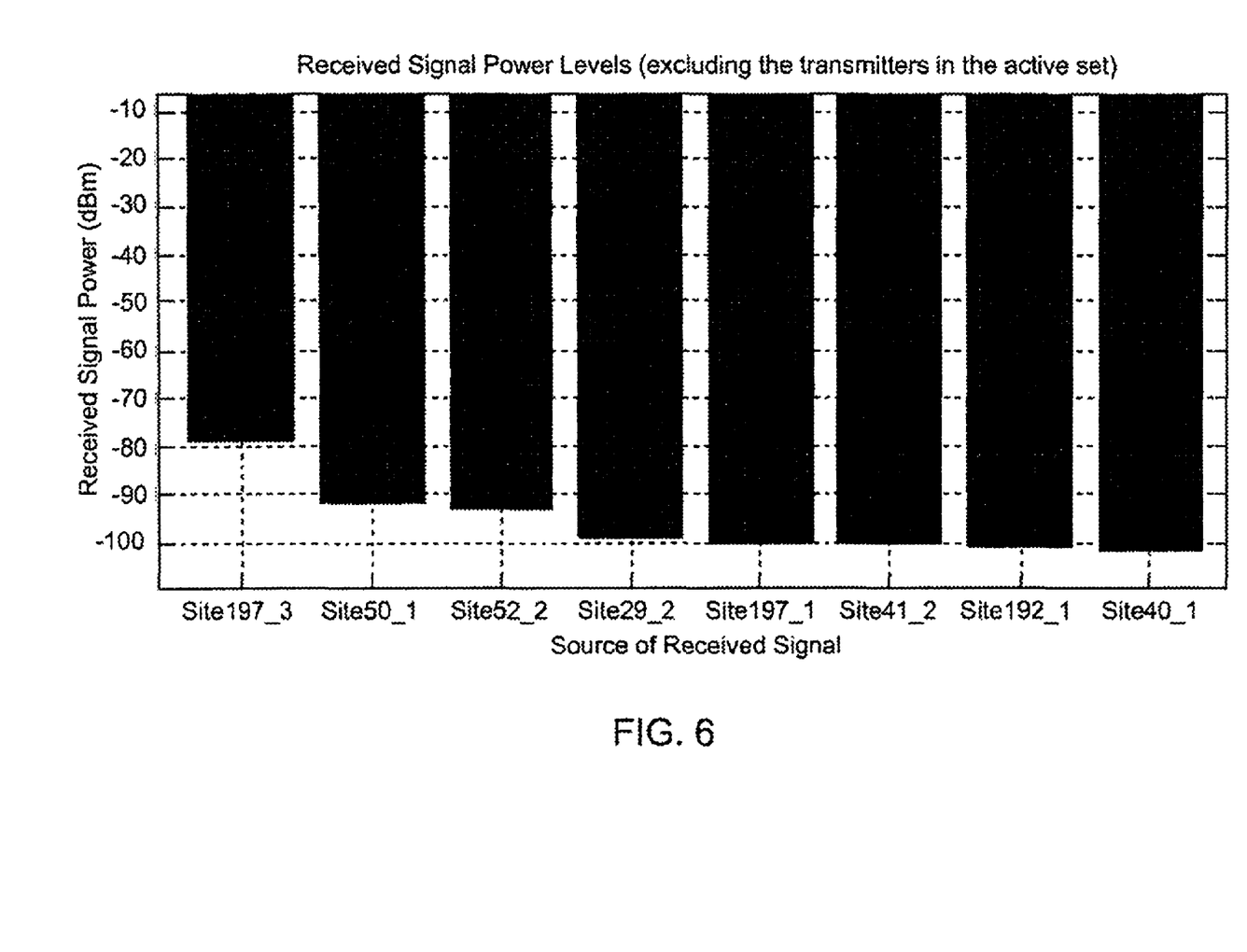
FIG. 6 is a graph illustrating exemplary received signal power levels excluding transmitters in an active set, according to an embodiment.

The list of interfering signal sources may include transmitters 103 that have the highest interference power as measured by the mobile devices 106, transmitters 103 that cause interference in the highest number of mobile devices 106, transmitters 103 that cause interference in the highest number of cells, or transmitters 103 with a highest weight metric assigned. A list of exemplary signals interfering signal sources (i.e., excluding signal sources in an active set) are provided in FIG. 6.

In step 207, the RSCP measurements for the interfering signal sources are grouped and summed for each of the signal sources. In step 208, the summed RSCP measurements are sorted for the interfering source signals by the strongest. The strongest signals are determined by the signal strength received by the mobile devices 106. In step 209, it is determined if there are any other cell sites in the network and, if not, a list of transmitters 103 associated with the list of interfering signal sources is generated. The list of transmitters 103 may be based on network configuration information received from the network database 110 or the antenna adjustment apparatus 104. The list of transmitters is considered to include transmitters 103 in need of adjustment by the detection and interference reduction apparatus 101 and the antenna adjustment apparatus 104. In step 209, if it is determined that there are other cells sites on the network, then another cell site is selected in step 202, and the process in steps 203-209 are repeated.

Exemplary Implementation

The following is an exemplary implementation of the selection of a problem transmitter 103 causing interference in the wireless network 100 with respect to seven mobile devices 106 (also referred to here as user equipment (UE)). After collecting the interfering source signals (as noted above in steps 202-206), the first five significant interfering signal sources are listed for all mobile devices 106 (e.g., UE1-UE7) in the currently selected cell. That is, the first five significant signal sources are generated by excluding the signal sources in the active set, so that only the interfering signal sources remain. As noted above, an active set of signal sources are a set of sources assigned to provide source signals to a mobile device 106 in the cell site, whereas the interfering sources are sources not assigned to provide wireless communication services to a mobile device 106 in the cell site, but whose source signals are still being received. For the purpose of this example, the interferers (e.g., Interferers I-V) refer to the interfering source signals. Table 1 below contains the interferers for seven mobile devices 106, and in Table 2, the corresponding interference powers are listed.

TABLE 1

Sources Of Interference For User Equipments (UE)

|  | UE1 | UE2 | UE3 | UE4 |
|---|---|---|---|---|
| Interferer I | 'Site161_3' | 'Site73_3' | 'Site73_3' | 'Site63_1' |
| Interferer II | 'Site151_3' | 'Site161_3' | 'Site63_1' | 'Site64_2' |
| Interferer III | 'Site73_3' | 'Site63_1' | 'Site172_2' | 'Site73_3' |
| Interferer IV | 'Site75_3' | 'Site172_2' | 'Site161_3' | 'Site189_2' |
| Interferer V | 'Site63_1' | 'Site64_2' | 'Site64_2' | 'Site151_3' |

|  | UE5 | UE6 | UE7 |
|---|---|---|---|
| Interferer I | 'Site161_3' | 'Site161_3' | 'Site73_3' |
| Interferer II | 'Site73_3' | 'Site63_1' | 'Site63_1' |
| Interferer III | 'Site63_1' | 'Site172_2' | 'Site64_2' |
| Interferer IV | 'Site73_1' | 'Site84_1' | 'Site172_2' |
| Interferer V | 'Site84_1' | 'Site64_2' | 'Site161_3' |

TABLE 2

Interference Levels (in dBm) For UEs

|  | UE1 | UE2 | UE3 | UE4 | UE5 | UE6 | UE7 |
|---|---|---|---|---|---|---|---|
| Interferer I Power (dBm) | −90 | −87 | −80 | −87 | −89 | −90 | −91 |
| Interferer II Power (dBm) | −93 | −91 | −87 | −89 | −91 | −94 | −91 |
| Interferer III Power (dBm) | −96 | −93 | −92 | −91 | −95 | −95 | −91 |
| Interferer IV Power (dBm) | −96 | −94 | −96 | −98 | −96 | −97 | −91 |
| Interferer V Power (dBm) | −96 | −96 | −97 | −101 | −96 | −97 | −95 |

For the current cell, all sources of interference are identified using the table exemplified in Table 1. Then, the accumulated interference power is found for each of these interferers by simply adding the numbers (in mW) that belong to a specific interferer. These total interference values are sorted and the strongest three interferers, for example, are determined along with the corresponding values. In this example, the interferers that cause interference the most frequently are determined as being transmitted from a problem transmitter 103. However, the interferers can be determined based on interferers that have the highest interference power as measured by the mobile devices 106, interferers that cause interference in the highest number of mobile devices 106, interferers that cause interference in the highest number of cells, or interferers with the highest weight metric assigned. A list of transmitters corresponding to the list of problem interferers is generated. The list of transmitters is generated based on network configuration information received from the network database 110 or the antenna adjustment apparatus 104. The list of transmitters is considered to include transmitters 103 in need of adjustment by the detection and interference reduction apparatus 101 and the antenna adjustment apparatus 104.

Now referring to FIG. 3, in step 302, a problem transmitter 103 is selected for the list of transmitters generated (i.e., in step 209) as a transmitter 103 in need for adjustment. In step 303, a critical zone is determined with respect to the selected cell site and the problem transmitter 103. The critical zone refers to a set of the neighbor cell sites in the vicinity of the selected cell site whose performance can be affected by performance in the selected cell site. The critical zone may contain direct neighbor cells sites of the selected cell site or additional levels of neighbor cell sites (i.e., indirect neighbor cell sites) with regard to the selected cell.

In step 304, the detection and interference reduction apparatus 101 makes adjustments to the selected problem transmitter 103 and the corresponding antenna 105 via the controller 102 and antenna adjustment apparatus 104, respectively. Adjustments can be made by altering the antenna parameters such as antenna tilt and transmit power of the transmitter 103. In step 305, after adjustments to the transmitter 103 and the corresponding antenna 105 are made, the performance in the critical zone is monitored by considered performance metrics in the critical zone. For example, the performance metrics can be based on dropped call rate (DCR), which has exceeded certain dropped call rate threshold over a certain observation window of time. An observation window is simply a specified time period such a number or days. The performance metric can also be calculated across specific time slots in different time frames. For example, Mondays to Fridays, Mondays only or Mondays to Fridays morning hours.

In step 306, if performance in the critical zone has degraded, then in step 309, the detection and interference reduction apparatus 101 returns to the best previous configuration of the transmitter 103 and the process ends. In step 306, if performance in the critical zone is not degraded, then in step 307, the average ratio of best server power to the interferer power (the average C/I ratio) measured by interfered mobile devices in the interfered cell sites is determined, where the best server power is the signal power of the best server and the interferer power is the signal power from the transmitter 103. In step 307, if it is determined that the average C/I ratio is improved, then in step 308 it is determined if further adjustments of the transmitter 103 and the antenna 105 are possible and if the improvement in the average C/I ratio has reached the desired level. If further adjustments of the transmitter 103 and the antenna 105 are possible and improvement in the average C/I ratio has not reached the desired level, then further adjustments are made to the transmitter parameters and the antenna parameters as in step 304. As noted above, adjustments are made by altering parameters such as antenna tilt and transmit power of the transmitter 103. However, in step 308, if it is determined that no further adjustments of the transmitter 103 and antenna 105 are possible or the improvement in the average C/I ratio has already reached the desired level, then the detection and interference reduction apparatus 101 returns to the best previous configuration of the transmitter 103 and the process ends. Similarly, in step 307, if it is determined that interference in the cell site is increased as a result of the initial adjustments to the transmitter 103, then the detection and interference reduction apparatus 101 returns to the best previous configuration of the transmitter 103 and the process ends.

As noted above, optimization of the wireless network 100 is performed by utilizing certain metrics considered during monitoring the performance of the wireless network (e.g., in steps 305-309) after making adjustments to a transmitter 103 and an antenna 105 (e.g., in step 304)

Exemplary metrics considered are as follows:
Change in the average best server power to the interferer power ratio (C/I)
Critical Zone average Successful Call Rate (SCR)
Critical Zone average traffic increase for all hours.

The change in the average C/I perceived by the mobiles in the interfered cells is calculated as follows:

$$C/I\_Change = Avg\_I/C\_Initial - Avg\_I/C$$

where

Avg_I/C=the mean of best server power to the interferer power ratio measured by the mobile devices in the interfered cells during the last n days (converted to dB)

Avg_I/C_Initial=the mean of best server power to the interferer power ratio measured by the mobile devices in the interfered cells during the initial n days (converted to dB).

The average SCR is calculated for the sum of all the services including voice, data and HSDPA calls as follows:

$$SCR = \frac{\text{Number of successful calls in the zone for the last } n \text{ days}}{\text{Number of total seizures in the zone for the last } n \text{ days}}$$

The average increase in the traffic of the critical zone over all hours is calculated as follows:

$$TrafficIncAllHours = \frac{\text{Traffic\_TotWin} - \text{Traffic\_IniTotWin}}{\text{Traffic\_IniTotWin}}$$

where,
Traffic_TotWin=Total zone traffic for the last observation window for all hours; and
Traffic_IniTotWin=Total zone traffic for the initial window for all hours.

As noted above, the interference reduction method described above with reference, in particular, to FIG. 3 will terminate in the following situations:
The average C/I ratio in the interfered cell sites decreases
Significant performance degradation is observed in the critical zone
The desired improvement in the average C/I ratio is obtained
Further downtilting of the problem antenna is not possible.

Optimization of the wireless network 100 is achieved by detecting and reducing interference from problem transmitters 103 and continually searching for better performance even if the performance is only slightly degraded. As a result, the best performance may occur anytime during the interference reduction process (e.g., in FIGS. 2 and 3). Performance values are recorded in the network database 110 after each modification to transmitter parameters. Additionally, modifications are made to the transmitter parameters to yield the best performance, even if the best performance is a previous operating condition of the wireless network 100.

Figure 4:
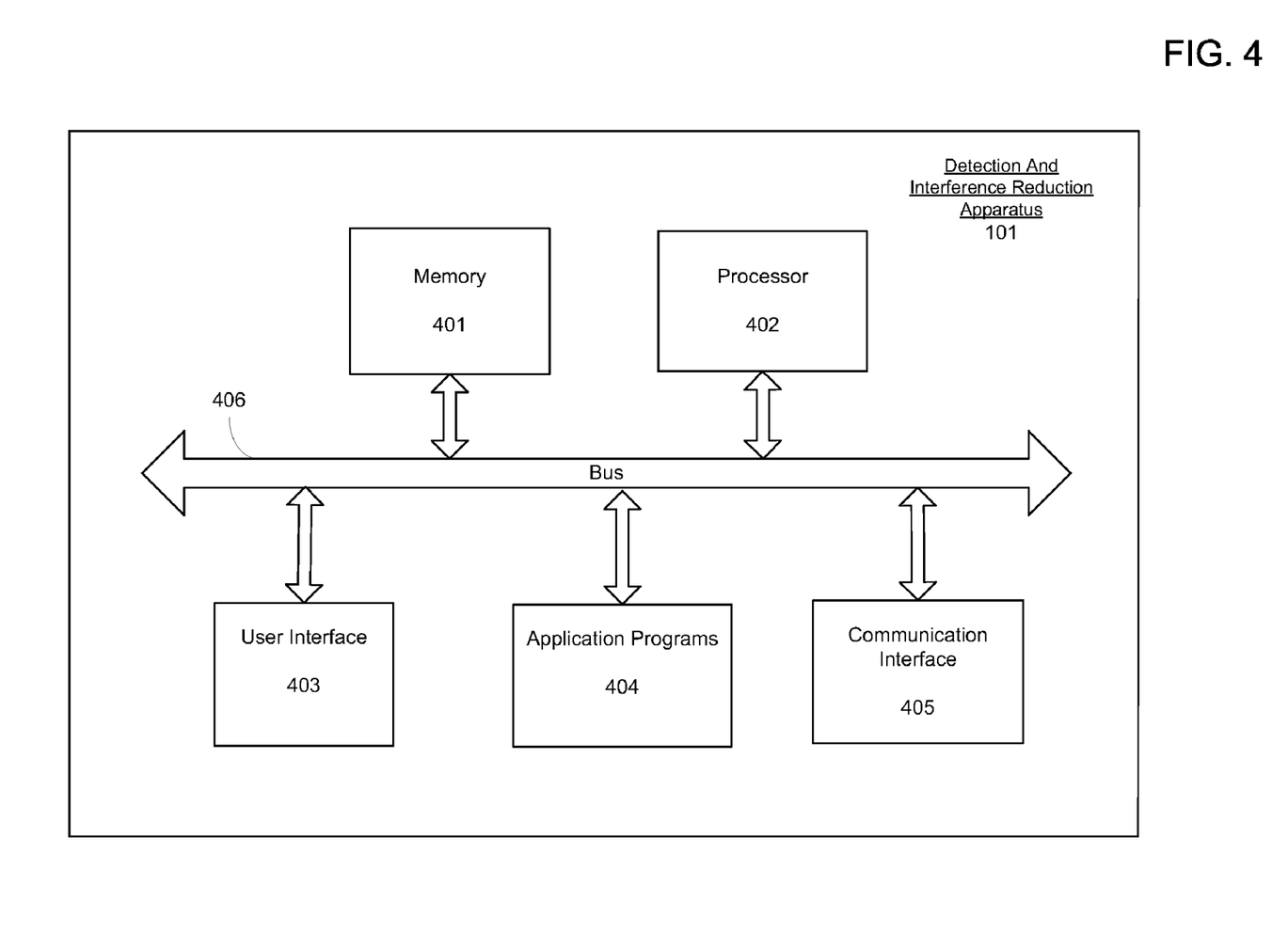
FIG. 4 illustrates an apparatus for detecting and reducing interference in cell sites of a wireless communications network in accordance with an embodiment of the invention.

FIG. 4 is a more detailed description of the detection and interference reduction apparatus 101 for performing the method of detecting and reducing interference in a selected cell site as described with reference to FIGS. 2 and 3. In FIG. 4, the detection and interference reduction apparatus 101 includes a memory 401, a processor 402, user interface 403, application programs 404, communication interface 405, and bus 406.

The memory 401 can be computer-readable storage medium used to store executable instructions, or computer program thereon. The memory 401 may include a read-only memory (ROM), random access memory (RAM), programmable read-only memory (PROM), erasable programmable read-only memory (EPROM), a smart card, a subscriber identity module (SIM), or any other medium from which a computing device can read executable instructions or a computer program. The term "computer program" is intended to encompass an executable program that exists permanently or temporarily on any computer-readable storage medium as described above.

The computer program is also intended to include an algorithm that includes executable instructions stored in the memory 401 that are executable by one or more processors 402, which may be facilitated by one or more of the application programs 404. The application programs 404 may also include, but are not limited to, an operating system or any special computer program that manages the relationship between application software and any suitable variety of hardware that helps to make-up a computer system or computing environment of the detection and interference reduction apparatus 101. Additionally, the application programs 404 also include one or more interferer detection and interference reduction algorithms for performing the detecting and interference reduction method described with reference to FIGS. 2 and 3. The one or more interferer detection and interference reduction algorithms for performing the detecting and interference reduction method described with reference to FIGS. 2 and 3 can also be stored in memory 401. General communication between the components in the detection and interference reduction apparatus 101 is provided via the bus 406

The user interface 403 allows for interaction between a user and the detection and interference reduction apparatus 101. The user interface 403 may include a keypad, a keyboard, microphone, and/or speakers. The communication interface 405 provides for two-way data communications from the detection and interference reduction apparatus 101. By way of example, the communication interface 405 may be a digital subscriber line (DSL) card or modem, an integrated services digital network (ISDN) card, a cable modem, or a telephone modem to provide a data communication connection to a corresponding type of telephone line. As another example, communication interface 405 may be a local area network (LAN) card (e.g., for Ethernet™ or an Asynchronous Transfer Model (ATM) network) to provide a data communication connection to a compatible LAN.

Further, the communication interface 405 may also include peripheral interface devices, such as a Universal Serial Bus (USB) interface, a Personal Computer Memory Card International Association (PCMCIA) interface, and the like. The communication interface 405 also allows the exchange of information across one or more wireless communication networks. Such networks may include cellular or short-range, such as IEEE 802.11 wireless local area networks (WLANS). And, the exchange of information may involve the transmission of radio frequency (RF) signals through an antenna (not shown).

From the description provided herein, those skilled in the art are readily able to combine software created as described with the appropriate general purpose or special purpose computer hardware for carrying out the features of the invention.

Additionally, it should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claim.

What is claimed is:

1. A method, comprising:
   Selecting a cell site from a plurality of cell sites of a wireless communications network, the cell site being a region in which wireless communications are provided to a plurality of mobile devices;
   receiving signal code power measurements from each mobile device from the plurality of mobile devices in the cell site;
   determining, for each mobile device from the plurality of mobile devices, a set of base station transmitters that transmit signals to that mobile device from the plurality of mobile devices in the cell site based on the signal code power measurements from that mobile device from the plurality of mobile devices;
   determining, for each mobile device from the plurality of mobile devices, a set of interfering base station transmitters corresponding to the set of base station transmitters for that mobile device minus base station transmitters from a set of base station transmitters assigned to provide source signals to that mobile device from the plurality of mobile devices in the cell site; and
   summing, for each interfering base station transmitter from the set of interfering base station transmitters for each mobile device from the plurality of mobile devices, a set of signal code power values received in the signal code power measurements from at least one mobile device from the plurality of mobile devices and associated with that interfering base station transmitter from the set of interfering base station transmitters to produce a summed signal code power measurement for each interfering base station transmitter from the set of interfering base station transmitters.

2. The method of claim 1, further comprising:
   ranking the summed signal code power measurement for each interfering base station transmitter from the set of interfering base station transmitters with the summed signal code power measurements for the remaining interfering base station transmitters from the set of interfering base station transmitters to produce a ranked set of summed signal code power measurements.

3. The method of claim 2, wherein the selecting, the receiving, the determining of the set of base station transmitters, the determining the set of interfering base station transmitters, the summing, and the ranking are performed for each cell site from the plurality of cell sites of the wireless communications network.

4. The method of claim 1, wherein the set of interfering base station transmitters includes at least one of:
   a base station transmitter having a highest interference power as measured by the plurality of mobile devices,
   a base station transmitter causing interference in a highest number of mobile devices,
   a base station transmitter causing interference in a highest number of cell sites from the plurality of cell sites, or
   a base station transmitter with a highest weight metric assigned.

5. The method of claim 1, wherein each interfering base station transmitter from the set of interfering base station transmitters is a base station transmitter not assigned to provide wireless communication services to a mobile device from the plurality of mobile devices in the cell site, but whose source signal is still being received by that mobile device from the plurality of mobile devices in the cell site.

6. The method of claim 1, further comprising:
   sending, in response to the determining the set of interfering base station transmitters, a signal configured to alter a parameter of a base station transmitter from the set of interfering base station transmitters.

7. An apparatus, comprising:
   a communication interface;
   a processor operatively coupled to the communication interface; and
   a memory operatively coupled to the processor, the memory configured to store a detection program to detect interference in a plurality of cell sites of a wireless network,
   the processor, when executing the detection program, configured to select from the plurality of cell sites of the wireless communication network, the cell sire being a region in which wireless communications are provided to a plurality of mobile devices;

the processor, when executing the detection program, configured to receive signal code power measurements from each mobile device from the plurality of mobile devices in the cell site;

the processor, when executing the detection program, configured to determine, for each mobile device from the plurality of mobile devices, a set of base station transmitters that transmit signals to that mobile device from the plurality of mobile devices in the cell site based on the signal code power measurements from that mobile device from the plurality of mobile devices;

the processor, when executing the detection program, configured to determine, for each mobile device from the plurality of mobile devices, a set of interfering base station transmitters corresponding to the set of base station transmitters for that mobile device minus base station transmitters from a set of base station transmitters assigned to provide source signals to that mobile device from the plurality of mobile devices in the cell site; and the processor, when executing the detection program, configured to sum, for each interfering base station transmitter from the set of interfering base station transmitters for each mobile device from the plurality of mobile devices, a set of signal code power values received in the signal code power measurements from at least one mobile device from the plurality of mobile devices and associated with that interfering base station transmitter from the set of interfering base station transmitters to produce a summed signal code power measurement for each interfering base station transmitter from the set of interfering base station transmitters.

8. The apparatus of claim 7, wherein:

the processor, when executing the detection program, is configured to rank the summed signal code power measurement for each interfering base station transmitter from the set of interfering base station transmitters to produce a ranked set of summed signal code power measurements.

9. The apparatus of claim 8, wherein the processor, when executing the detection program, is configured to repeatedly select, receive, determine the set of base station transmitters, determine the set of interfering base station transmitters, sum, and rank for each cell site from the plurality of cell sites of the wireless communications network.

10. The apparatus of claim 7, wherein the set of interfering base station transmitters includes at least one of:

a base station transmitter having a highest interference power as measured by the plurality of mobile devices, a base station transmitter causing interference in a highest number of mobile devices from the plurality of mobile devices, a base station transmitter causing interference in a highest number of cell sites from the plurality of cell sites, or a base station transmitter with a highest weight metric assigned.

11. The apparatus of claim 7, wherein each interfering base station transmitter from the set of interfering base station transmitters is a base station transmitter not assigned to provide wireless communication services to a mobile device from the plurality of mobile devices in the cell site, but whose source signal is still being received by that mobile device from the plurality of mobile devices in the cell site.

12. The apparatus of claim 7, wherein the processor, when executing the detection program, is configured to send a signal configured to alter a parameter of a base station transmitter from the set of interfering base station transmitters in response to determining the set of interfering base station transmitters.

13. A method, comprising:

receiving a signal code power measurement from each mobile device from a plurality of mobile devices in a cell site from a plurality of cell sites within a wireless communications network;

determining, for each mobile device from the plurality of mobile devices, a set of interfering base station transmitters based on the signal code power measurement from that mobile device from the plurality of mobile devices, each interfering base station transmitter from the set of interfering base station transmitters for that mobile device (1) providing a source signal to that mobile device and (2) not being assigned to provide the source signal to that mobile device;

summing, for each interfering base station transmitter from the set of interfering base station transmitters for each mobile device from the plurality of mobile devices, a set of signal code power values received in the signal code power measurement from at least one mobile device from the plurality of mobile devices and associated with that interfering base station transmitter from the set of interfering base station transmitters to produce a summed signal code power measurement for each interfering base station transmitter from the set of interfering base station transmitters; and sending a signal configured to alter a parameter of a base station transmitter from the set of interfering base station transmitters based on the summed signal code power measurement for that base station transmitter from the set of interfering base station transmitters.

14. The method of claim 13, further comprising:

ranking the summed signal code power measurement for each interfering base station transmitter from the set of interfering base station transmitters to produce a ranked set of summed signal code power measurements, the sending including sending the signal configured to alter the parameter of the base station transmitter from the set of interfering base station transmitters based on the summed signal code power measurement for that base station transmitter having a highest rank order from the ranked set of summed signal code power measurements.

15. The method of claim 13, wherein the receiving, the determining, the summing and the sending are performed for each cell site from the plurality of cell sites of the wireless communications network.

16. The method of claim 13, wherein the determining includes:

determining a set of base station transmitters that transmit signals to the mobile device from the plurality of mobile devices in the cell site based on the signal code power measurement from the mobile device from the plurality of mobile devices, and determining which base station transmitters from the set of base station transmitters are not assigned to provide source signals to the mobile device to define the set of interfering base station transmitters for that mobile device.

17. The method of claim 13, further comprising:

receiving, before the receiving the signal code power measurement, at least one performance statistic for the wireless communications network; and selecting, before the receiving the signal code power measurement, the cell site from the plurality of cell sites based on the at least one performance statistic.

18. The method of claim 13, wherein each signal code power value from the set of signal code power values is received in a signal code power measurement from a different mobile device from the plurality of mobile devices.

* * * * *

UNITED STATES PATENT AND TRADEMARK OFFICE
CERTIFICATE OF CORRECTION

PATENT NO.        : 8,229,363 B1
APPLICATION NO.   : 13/118771
DATED             : July 24, 2012
INVENTOR(S)       : Sahin et al.

Page 1 of 1

It is certified that error appears in the above-identified patent and that said Letters Patent is hereby corrected as shown below:

Column 10, line 28, delete "of";
    line 38, after "devices" insert --from the plurality of mobile devices--;
    line 64, after "select" insert --a cell site--; and
    line 65, delete "communication"; and change "sire" to --site--.

Column 11, line 44, delete "comunications".

Column 12, line 52, change "the" (first occurrence) to --a--; and
    line 54, change "the" (first occurrence) to --a--.

Signed and Sealed this
Ninth Day of April, 2013

Teresa Stanek Rea
*Acting Director of the United States Patent and Trademark Office*